Sept. 28, 1948.    H. L. THOMPSON ET AL    2,450,365
TOOLHOLDER
Filed June 7, 1945

*INVENTORS*
HAROLD L. THOMPSON
BY NATHANIEL KING
Charles R. Fay, atty.

Patented Sept. 28, 1948

2,450,365

UNITED STATES PATENT OFFICE 2,450,365

TOOLHOLDER

Harold L. Thompson, Athol, and Nathaniel King, Fitchburg, Mass., assignors to ATF Incorporated, a corporation of New Jersey Application June 7, 1945, Serial No. 597,984

5 Claims. (Cl. 29—96)

This invention relates to a new and improved tool holder having improved means for adjustably holding and backing up the tool bit, the construction being particularly applicable for holding Carboloy tips.

Objects of the invention include the provision of a tool holder having improved means for holding down a tool bit such as a Carboloy tip and including a backing up device which is adjustable so that as the tool bit is ground for sharpening, the backing up device may be moved forward, backing up the tip; the provision of a tool holder as above stated in which the backing up device comprises a plate adjustably secured to the tool holder in operative position to the tool bit and including means forcing the tool bit against a side wall of the tool holder so that the bit cannot kick out laterally, or become displaced in any direction.

Further objects of the invention include the provision of a tool holder as above stated including interengaging serrated means between the backing up plate and the tool holder for adjustably backing up and positively locking the former, in combination with means clamping the backing up plate to the tool holder; and as a modification thereof, the invention contemplates the use of means for adjusting and locking the backing up plate in the absence of the serrations.

Other objects and advantages of the invention will appear hereinafter.

Reference is to be had to the accompanying drawings in which

Figure 1:
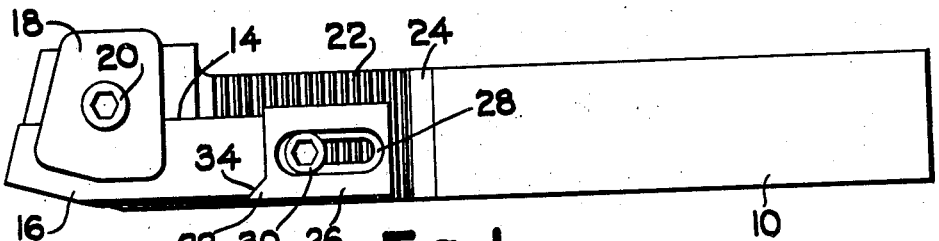
Fig. 1 is a top plan view of a tool holder embodying the present invention.
Figure 3:
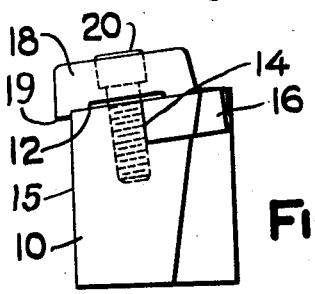
Fig. 3 is a view in end elevation of the holders of Fig. 1 and Fig. 2.
Figure 2:
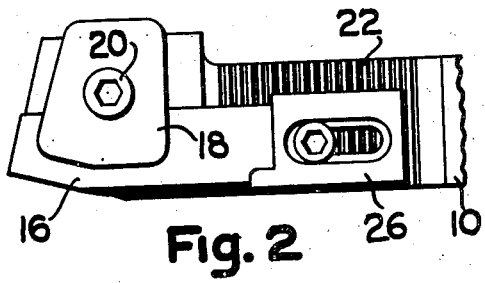
Fig. 2 is a broken away view similar to Fig. 1 but showing a modification thereof.

In the use of special tool steel bits such as Carboloy tips, it has been found to be a problem to provide a satisfactory holder. The present invention provides a special holder to receive any type of tool bit which may be ground in special fixtures and stocked so that tips of various configurations are immediately available for use in the holder. In the use of the present device, the tips and also the tool holders find increased use and length of life due to the construction of the new holder, and the present invention eliminates brazing of the tips to the holder so that the holder itself need not be ground back.

As illustrated in the drawings, the invention contemplates an elongated tool holder shank 10 which may be provided with a top surface 12 and including a cut-away portion forming a side wall at 14, said cutaway portion 24 being of less than the full width of the shank at the end thereof and thus defining a projection with a top surface 12, a side wall abutment 14, and a side wall 15 opposite thereto.

A clamp 18 is provided for holding the tool bit 16 down against the tool holder and this clamp may be provided with a fastener such as a machine screw 20 threaded into the tool holder as shown. Clamp 18 is easily loosened for adjustment of the bit 16 along the side wall 14. The clamp 18 may be provided with a flange 19 extending part way down over the side wall 15 opposite the side wall 14. In this way rotation of the clamp 18 is prevented.

Figure 4:
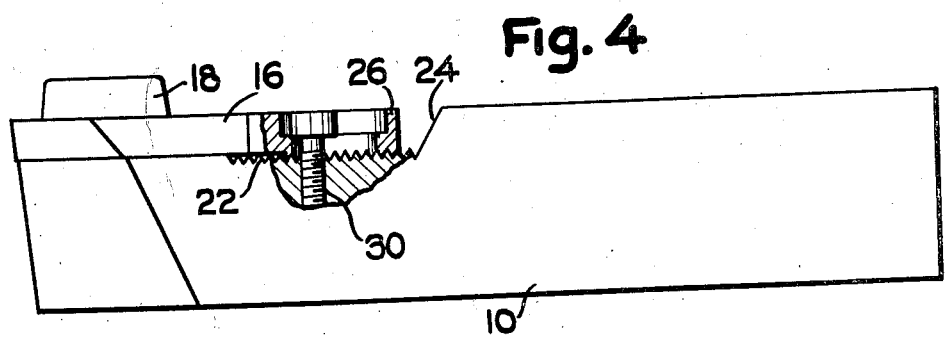
Fig. 4 is a view in side elevation of the tool holder.

To the rear of the clamp 18 the shank 10 is provided with a serrated top surface 22 located in a cut-away portion 24 receiving a tool backing up plate 26. The plate 26 is provided with a thru slot 28 in which is located a screw 30 taking into the shank 10 as clearly shown in Fig. 4. The underside of plate 26 is provided with serrations complementary to the serrated surface 22 and thus it will be clear that the backing up plate 26 may be longitudinally adjustable by loosening the screw 30 sufficiently to allow disengagement thereof and movement to a different position.

The top surfaces of the tool bit, the backing up plate, and the shank may all be in the same plane.

It is pointed out that the present construction is equally applicable to right or left hand tools as desired and the invention contemplates construction for both right and left hand tool holders.

This invention provides a tool holder for accommodating removable and replaceable tool bits which will have long usefulness due to the fact that they may be reground a great many times before discarding, and the removable tips are easily adjusted and replaced. It is also to be noted that the tips themselves may be ground without grinding the tool holder so that the holder itself has a longer life than holders in which the tips are brazed. The tips will be plane on top and bottom surfaces and require no holes so that tips of many different shapes may be kept in stock for many different operations with the same tool holder.

Having thus described our invention and the advantages thereof, we do not wish to be lim- ited to the details herein disclosed, otherwise than as set forth in the claims, but what we claim is:

1. A tool holder comprising an elongated shank having a cutaway portion defining a projection at one end thereof and providing a tool bit supporting surface and a side wall abutment for the tool bit, an adjustable screw-held backing-up plate arranged on said shank for endwise abutment of the tool bit, and a screw clamp arranged on said projection and having a flange extending along and over the side of said projection opposite the said side wall, said screw clamp being adapted to maintain a tool bit in operative cutting position in the tool holder in abutment with said backing-up plate and side wall.

2. A tool holder comprising an elongated shank having a cutaway portion defining a projection at one end thereof and providing a tool bit supporting surface and a side wall abutment for the tool bit, an adjustable screw-held backing-up plate arranged on said shank for endwise abutment of the tool bit, said backing-up plate having serrations on its underface, serrations on the surface of the shank receiving the backing-up plate interfitting with the serrations on the said backing-up plate, and a screw clamp arranged on said projection and having a flange extending along and over the side of said projection opposite the said side wall, said screw clamp being adapted to maintain a tool bit in operative cutting position in the tool holder in abutment with said backing-up plate and side wall.

3. A tool holder comprising an elongated shank having a portion cut away from the top surface thereof at one end, the cutaway portion being of less than the full width of the shank at one portion thereof and thus defining a tool bit supporting surface and a projecting portion, a side wall of which adjacent the said surface provides a side wall abutment for a tool bit, a screw clamp mounted and supported on said projection and adapted to maintain a tool bit in operative cutting position against the said tool bit supporting surface and side wall, and an adjustable screw-held backing-up plate arranged on said shank for endwise abutment of the tool bit.

4. A tool holder comprising an elongated shank having a tool bit supporting surface thereon, a side wall for abutment of the tool bit, a screw clamp adapted to maintain a tool bit in operative cutting position in the tool holder in abutment with said tool bit supporting surface and side wall and having a flange extending over and parallel with the face of the side wall remote from the face against which the tool bit abuts, and an adjustable screw-held backing-up plate arranged on said shank for endwise abutment of the tool bit.

5. A tool holder comprising an elongated shank having a tool bit supporting surface thereon, a side wall for abutment of the tool bit, a screw clamp adapted to maintain a tool bit in operative cutting position in the tool holder in abutment with said tool bit supporting surface and side wall, and an adjustable screw-held backing-up plate arranged on said shank for endwise abutment of the tool bit.

HAROLD L. THOMPSON.
NATHANIEL KING.

REFERENCES CITED

The following references are of record in the file of this patent:

UNITED STATES PATENTS

| Number | Name | Date |
| --- | --- | --- |
| 1,192,110 | Pilkington | July 25, 1916 |
| 1,346,056 | Poulain | July 6, 1920 |
| 1,793,564 | Severson | Feb. 24, 1931 |
| 2,169,482 | West | Aug. 15, 1939 |

FOREIGN PATENTS

| Number | Country | Date |
| --- | --- | --- |
| 454,340 | Great Britain | Sept. 29, 1936 |

OTHER REFERENCES

American Machinist, May 1, 1924, "An Economical Toolholder," by F. L. Lewis, volume 60, No. 18.